(12) United States Patent
Nakazawa (10) Patent No.: US 10,120,230 B2
(45) Date of Patent: Nov. 6, 2018

(54) IMAGE DISPLAY APPARATUS AND CONTROL METHOD THEREFOR

(71) Applicant: CANON KABUSHIKI KAISHA, Tokyo (JP)

(72) Inventor: Tomonori Nakazawa, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/240,661

(22) Filed: Aug. 18, 2016

(65) Prior Publication Data
US 2017/0059920 A1   Mar. 2, 2017

(30) Foreign Application Priority Data

Aug. 31, 2015   (JP) .................................. 2015-170596

(51) Int. Cl.
| | | |
|---|---|---|
| *G02F 1/1333* | (2006.01) | |
| *G09F 9/00* | (2006.01) | |
| *G09G 3/34* | (2006.01) | |
| *G09G 3/36* | (2006.01) | |

(52) U.S. Cl.
CPC .......... *G02F 1/133385* (2013.01); *G09F 9/00* (2013.01); *G09G 3/3406* (2013.01); *G09G 3/36* (2013.01); *G09G 2320/041* (2013.01); *G09G 2320/0626* (2013.01); *G09G 2360/145* (2013.01)

(58) Field of Classification Search
CPC .......... G02F 1/133385; H05K 7/20972; G09G 2320/041
See application file for complete search history.

(56) References Cited

U.S. PATENT DOCUMENTS

| | | | |
|---|---|---|---|
| 2006/0192750 A1* | 8/2006 | Lai | G02F 1/133604 345/102 |
| 2006/0232919 A1* | 10/2006 | Jeong | H05K 7/20972 361/679.22 |
| 2007/0047199 A1* | 3/2007 | Tsutsui | G06F 1/206 361/679.48 |
| 2007/0098374 A1* | 5/2007 | Fujiwara | G06F 1/206 388/811 |
| 2008/0165482 A1* | 7/2008 | Kim | G09G 5/003 361/679.21 |

(Continued)

FOREIGN PATENT DOCUMENTS

JP   2007-004872 A   1/2007

*Primary Examiner* — Mariceli Santiago
(74) *Attorney, Agent, or Firm* — Canon U.S.A., Inc. IP Division (57) ABSTRACT

An image display apparatus includes a display module that displays an image, a cooling fan that rotates to cool the display module, an ambient temperature sensor that acquires an ambient temperature of the display module, and a fan control circuit board that controls a speed of rotation of the cooling fan. In response to acquisition of a mode change signal by the fan control circuit board, the fan control circuit board controls the speed of rotation of the cooling fan from a first speed of rotation to a second speed of rotation lower than the first speed of rotation and, in response to a lapse of a first period determined based on the ambient temperature, controls the speed of rotation of the cooling fan from the second speed of rotation to a third speed of rotation higher than the second speed of rotation.

25 Claims, 10 Drawing Sheets

(56) References Cited

U.S. PATENT DOCUMENTS

| | | | | |
|---|---|---|---|---|
| 2009/0122218 A1* | 5/2009 | Oh | ................... | G02F 1/133385 |
| | | | | 361/679.21 |
| 2010/0172098 A1* | 7/2010 | Isoshima | ............ | H05K 7/20972 |
| | | | | 361/697 |
| 2014/0218863 A1* | 8/2014 | Yoshida | ............. | H05K 7/20209 |
| | | | | 361/692 |

* cited by examiner

| POWER CONSUMPTION | | AMBIENT TEMPERATURE | | | |
|---|---|---|---|---|---|
| | ... | < 20 °C | < 25 °C | < 30 °C | ... |
| < 50 W | | 7 V | 8 V | 9 V | |
| < 100 W | | 8 V | 9 V | 10 V | |
| < 150 W | | 9 V | 10 V | 11 V | |
| ... | | | | | |

FIG. 5

| POWER CONSUMPTION | | AMBIENT TEMPERATURE | | | |
|---|---|---|---|---|---|
| | ... | < 20 °C | < 25 °C | < 30 °C | ... |
| < 50 W | | 120 sec | 110 sec | 100 sec | |
| < 100 W | | 110 sec | 100 sec | 90 sec | |
| < 150 W | | 100 sec | 90 sec | 80 sec | |
| ... | | | | | |

| POWER CONSUMPTION | | AMBIENT TEMPERATURE | | | |
|---|---|---|---|---|---|
| | ... | < 20 °C | < 25 °C | < 30 °C | ... |
| < 50 W | | 120 sec | 135 sec | 150 sec | |
| < 100 W | | 135 sec | 150 sec | 165 sec | |
| < 150 W | | 150 sec | 165 sec | 180 sec | |
| ... | | | | | |

FIG. 9

| POWER CONSUMPTION | | AMBIENT TEMPERATURE | | | |
|---|---|---|---|---|---|
| | ... | < 20 °C | < 25 °C | < 30 °C | ... |
| < 50W | | 9 V | 10 V | 11 V | |
| < 100W | | 10 V | 11 V | 12 V | |
| < 150W | | 11 V | 12 V | 12 V | |
| ... | | | | | |

IMAGE DISPLAY APPARATUS AND CONTROL METHOD THEREFOR

BACKGROUND

Field

Aspects of the present invention generally relate to an image display apparatus including a display module configured to display an image and a cooling fan configured to cool the display module and a control method therefor.

Description of the Related Art

Some image display apparatuses can include a display module having a display panel such as a liquid crystal panel, a display control circuit configured to control a display module, and a cooling fan configured to cool the display module and the display control circuit.

In such an image display apparatus, while images are being displayed by a display module, the display control circuit generates heat which increases the temperatures of the display module and the display control circuit. When the temperatures of electronic parts used in the display control circuit reach a high temperature, it is concerned that the electronic parts may not operate normally. In order to cool the display module and the display control circuit to a target temperature, a cooling fan can rotate to send air to the display module and the display control circuit. In this case, the rotating cooling fan can make noise.

Japanese Patent Laid-Open No. 2007-004872 discloses a recording device in which a recording start operation or a button operation performed by a user triggers to stop a cooling fan and resumes the rotation of the cooling fan in a case where a temperature detected by a temperature sensor provided in neighborhood of an electronic part within an electronic apparatus is higher than a predetermined threshold value. Thus, in order to reduce an influence of unnecessary noise during recording, for example, the noise made by the cooling fan can be reduced and prevent increases of the temperature of the electronic part having the temperature sensor.

SUMMARY

An aspect of the present invention provides an image display apparatus including a display module configured to display an image, a fan configured to rotate to cool the display module, a first detecting unit configured to acquire an ambient temperature of the display module, and a control unit configured to control a speed of rotation of the fan, wherein, in response to acquisition of a predetermined instruction by the control unit, the control unit controls the speed of rotation the fan from a first speed of rotation to a second speed of rotation lower than the first speed of rotation and, wherein, in response to a lapse of a first period determined based on the ambient temperature, the control unit controls the speed of rotation of the fan from the second speed of rotation to a third speed of rotation higher than the second speed of rotation.

Further features of aspects of the present invention will become apparent from the following description of exemplary embodiments with reference to the attached drawings.

DESCRIPTION OF THE EMBODIMENTS

Exemplary embodiments of the present invention will be described below with reference to drawings. It should be understood that the technical scope of the aspects of the present invention should be defined by the claimed scope and are not limited by the following exemplary embodiments. All of combinations of features according to exemplary embodiments are not required in the aspects of the present invention. Details described in the Specification and illustrated in drawings are provided for illustration purposes only and are not seen to limit the aspects of the present invention. Various changes, modifications, and alterations based on the spirit of the aspects of the present invention can be made and are not excluded from the scope of the aspects of the present invention. In other words, configurations acquired by combining exemplary embodiments and variation examples thereof are also included in the aspects of the present invention.

First Exemplary Embodiment

Figure 1:
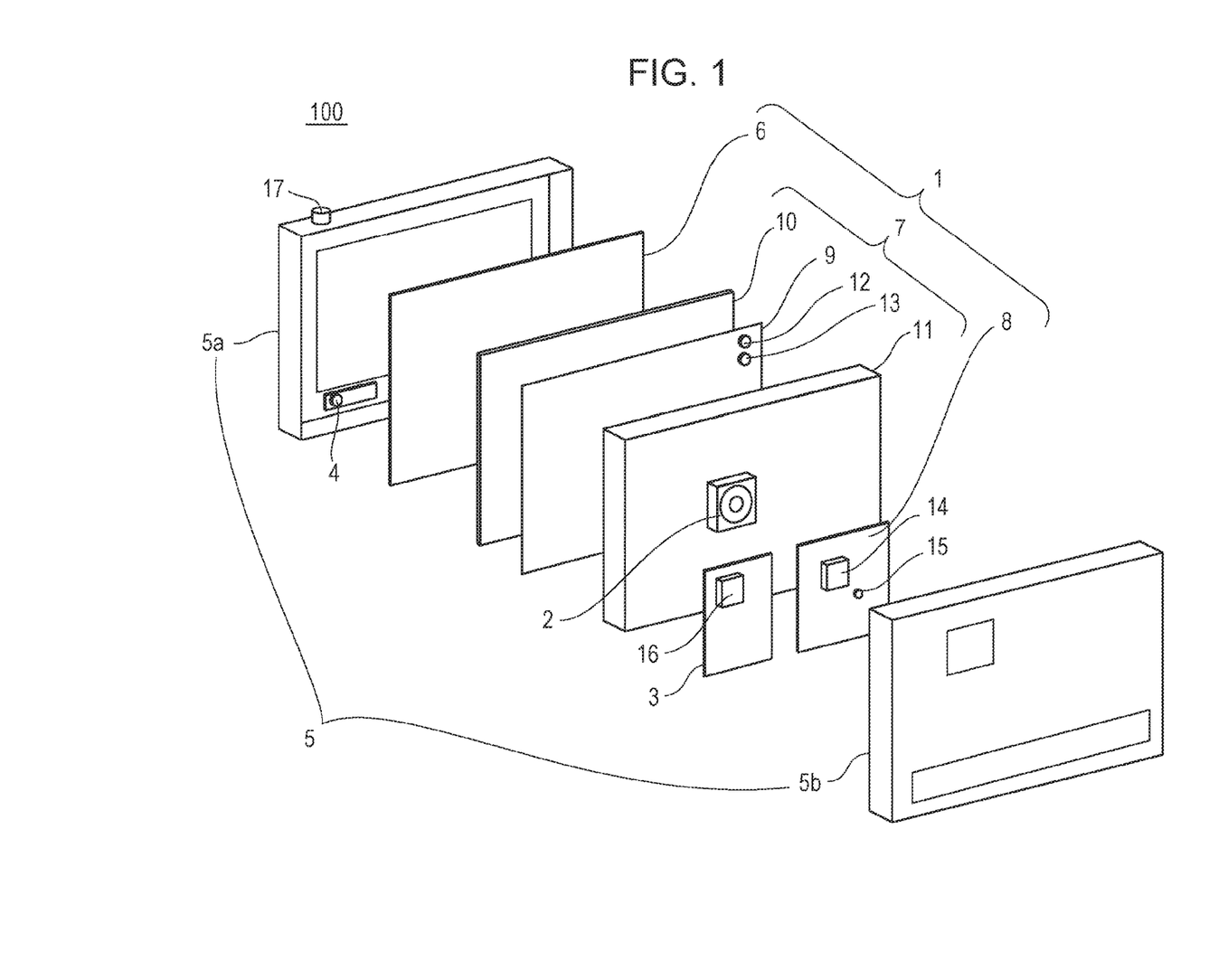
FIG. 1 an exploded perspective view of an image display apparatus according to aspects of the present invention.
Figure 2:
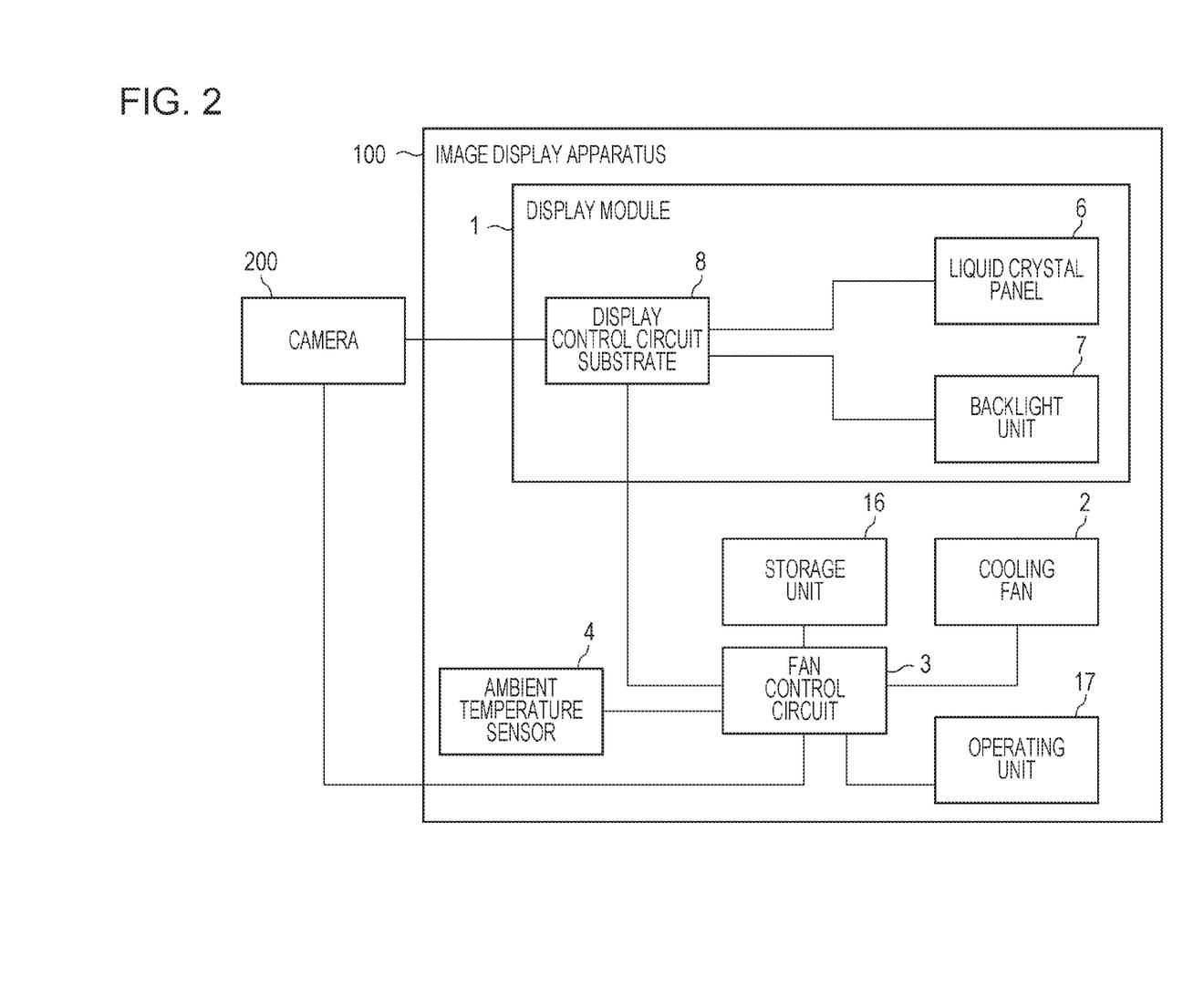
FIG. 2 is a block diagram illustrating a functional block of the image display apparatus.

FIG. 1 is an expanded perspective view of an image display apparatus 100 according to the present invention. FIG. 2 is a block diagram illustrating a functional block of the image display apparatus 100. The image display apparatus 100 includes a display module 1, a cooling fan 2, a fan control circuit board 3, an ambient temperature sensor 4, and a housing 5. The display module 1 includes a liquid crystal panel 6, a backlight unit 7, and a display control circuit substrate 8.

The liquid crystal panel 6 includes a plurality of liquid crystal pixels with light transmittances controllable individually, and the transmittances of the liquid crystal pixels are controlled by the display control circuit substrate 8 in accordance with an input image. The liquid crystal panel 6 enables a part of light irradiated from the backlight unit 7, which will be described below, to pass through and display an image. The liquid crystal panel 6 can be a transmissive display panel having Micro Electro Mechanical Systems (MEMS) pixels instead of liquid crystal pixels.

The backlight unit 7 includes a light source substrate 9, an optical sheet 10, a backlight housing 11, a backlight brightness sensor 12, and a backlight temperature sensor 13. The light source substrate 9 is a substrate including a plurality of light sources thereon. According to the first exemplary embodiment, the light sources are Light-Emitting Diode (LED) light sources. The light sources provided on the light source substrate 9 can be light sources having cold-cathode tubes, instead of the LED light sources. The light emitted from the light sources is irradiated to the optical sheet 10.

The optical sheet 10 is a sheet-shaped member configured to diffuse or polarize the light irradiated from the light sources and irradiate the light toward the liquid crystal panel 6. The optical sheet 10 includes a material and a shape selected such that characteristics of light irradiated to the liquid crystal panel 6 can satisfy target conditions.

The backlight housing 11 is a box-shaped housing having an aperture close to the liquid crystal panel 6 and accommodates the light source substrate 9 and the optical sheet 10. The light source substrate 9 and the optical sheet 10 are provided in the backlight housing 11 such that light irradiated from the light sources can be irradiated to the liquid crystal panel 6 through the optical sheet 10.

The backlight brightness sensor 12 is a brightness sensor configured to measure brightness of light emitted from the light sources and is provided on a surface facing the optical sheet 10 of the light source substrate 9. The backlight brightness sensor 12 measures brightness of light emitted from the light sources and outputs it to the display control circuit substrate 8. The backlight temperature sensor 13 is a temperature sensor provided on the light source substrate 9 and measures the temperature of the light source substrate 9 and outputs it to the display control circuit substrate 8.

The display control circuit substrate 8 is a circuit board connected to the liquid crystal panel 6 and the backlight unit 7 and includes a circuit configured to control operations of the liquid crystal panel 6 and the backlight unit 7 and a circuit configured to supply electric power to the liquid crystal panel 6 and the backlight unit 7. The display control circuit substrate 8 is provided on a back surface side of the backlight unit 7. The display control circuit substrate 8 includes an electronic part 14 and an electric power detector 15 configured to detect electric power consumed by the electronic part 14.

The electronic part 14 can be an electronic part used for controlling operations of the liquid crystal panel 6 and the backlight unit 7 or an electronic part used for supplying electric power to the liquid crystal panel 6 and the backlight unit 7. In other words the electronic part 14 includes an integrated circuit, such as a Field-Programmable Gate Array (FPGA), an electrolytic capacitor, a power transformer, etc. The electric power detector 15 is configured to detect power consumed by the electronic part 14 and output it to the fan control circuit board 3.

The display control circuit substrate 8 controls transmittances of the liquid crystal pixels on the liquid crystal panel 6 in accordance with an input image signal and controls a luminance of the backlight unit 7. The luminance of the backlight unit 7 and the transmittance of the liquid crystal panel 6 are corrected in accordance with the brightness output from the backlight brightness sensor 12 and the temperature of the light source substrate 9 output from the backlight temperature sensor 13.

The cooling fan 2 is a cooling unit provided on a back surface side of the display module 1 and configured to send air from external to the image display apparatus 100 to the display module 1 to cool the display module 1. Alternatively, the display module 1 can be cooled by externally evacuating air from inside the image display apparatus 100 by the cooling fan 2. The cooling fan 2 can be fixed to the display module 1 or be fixed to the housing 5.

The cooling fan 2 can just send air to the display module 1 using rotating blades and can be an axial fan, a sirocco fan, etc., and can send air in any manner. The cooling fan 2 includes blades that rotate at a speed controllable by driving voltage, and a power supply that can be a direct current power supply or an alternating current power supply. A plurality of cooling fans 2 can be provided. Rotating blades of the cooling fan 2 can cause wind noise, friction noise for driving, etc. The noise typically increases as the speed of rotation of the cooling fan 2 increases.

The fan control circuit board 3 includes a circuit provided on the back surface side of the display module 1 and configured to control operations of the cooling fan 2. The fan control circuit board 3 includes a storage unit 16, which can be a non-volatile recording medium provided on the fan control circuit board 3. While the present embodiment refers to a non-volatile recording medium, any type of recording medium enabling practice of the present embodiment is applicable. The fan control circuit board 3 controls the speed of rotation of the blades of the cooling fan 2. The speed of rotation is an amount corresponding to the number of rotations per unit time of the blades of the cooling fan 2.

According to the first exemplary embodiment, the fan control circuit board 3 controls operations of the cooling fan 2 in a normal operation mode or a low-noise operation mode. The fan control circuit board 3 determines a driving condition in the normal operation mode of the cooling fan 2 in accordance with an ambient temperature of the surroundings of the image display apparatus 100, which is measured by the ambient temperature sensor 4, and a power consumption detected by the electric power detector 15.

The fan control circuit board 3 reads out, from the storage unit 16, operation information containing ambient temperatures and power consumptions in association with driving conditions of the cooling fan 2 and determines a driving condition based on the acquired ambient temperature and power consumption. The driving condition according to the first exemplary embodiment is a driving voltage for the cooling fan 2. The driving condition is not limited to the driving voltage for the cooling fan 2 and can be the speed of rotation.

The ambient temperature sensor 4 outputs a measured ambient temperature to the fan control circuit board 3. According to the first exemplary embodiment, the ambient temperature sensor 4 is provided on a front surface side of the housing 5. However, the ambient temperature sensor 4 can be provided at any arbitrary position where the ambient temperature of the surroundings of the image display apparatus 100 can be measured.

The housing 5 is a box-shaped case having an aperture on its front surface side and accommodates the display module 1, the cooling fan 2, the fan control circuit board 3, and the ambient temperature sensor 4. The housing 5 is formed by combining a frame 5a and a back case 5b. The frame 5a includes an aperture for exposing a screen of the liquid crystal panel 6 and is a frame-shaped member covering the front surface side and sides of the display module 1. The back case 5b is a case provided on the back surface side of the display module 1 and accommodates the cooling fan 2 and the fan control circuit board 3. The surface facing the cooling fan 2 of the back case 5b includes a bleeder.

An operating unit 17 provided on the frame 5a is a switch for outputting a mode change signal in response to a user's operation to the fan control circuit board 3. The mode change signal output from the operating unit 17 is input to the fan control circuit board 3. The operating unit 17 is not limited to a physical switch provided on the housing 5, and any interface that would enable controlling the mode is applicable. The operating unit 17 outputs the mode change signal to the fan control circuit board 3 in response to an operation performed on an On Screen Display (OSD) displayed on a screen of the display module 1.

As illustrated in the functional block diagram in FIG. 2, the image display apparatus 100 is connected to a camera 200. The camera 200 is an imaging apparatus configured to capture an image and outputs an image signal based on a captured image to the image display apparatus 100. The camera 200 outputs a record signal to the image display apparatus 100 in accordance with a start of recording of a captured image. In a case where the record signal output from the camera 200 is detected by the fan control circuit board 3, the fan control circuit board 3 performs the same processing as the processing to be performed when a mode change signal is input.

Figure 3:
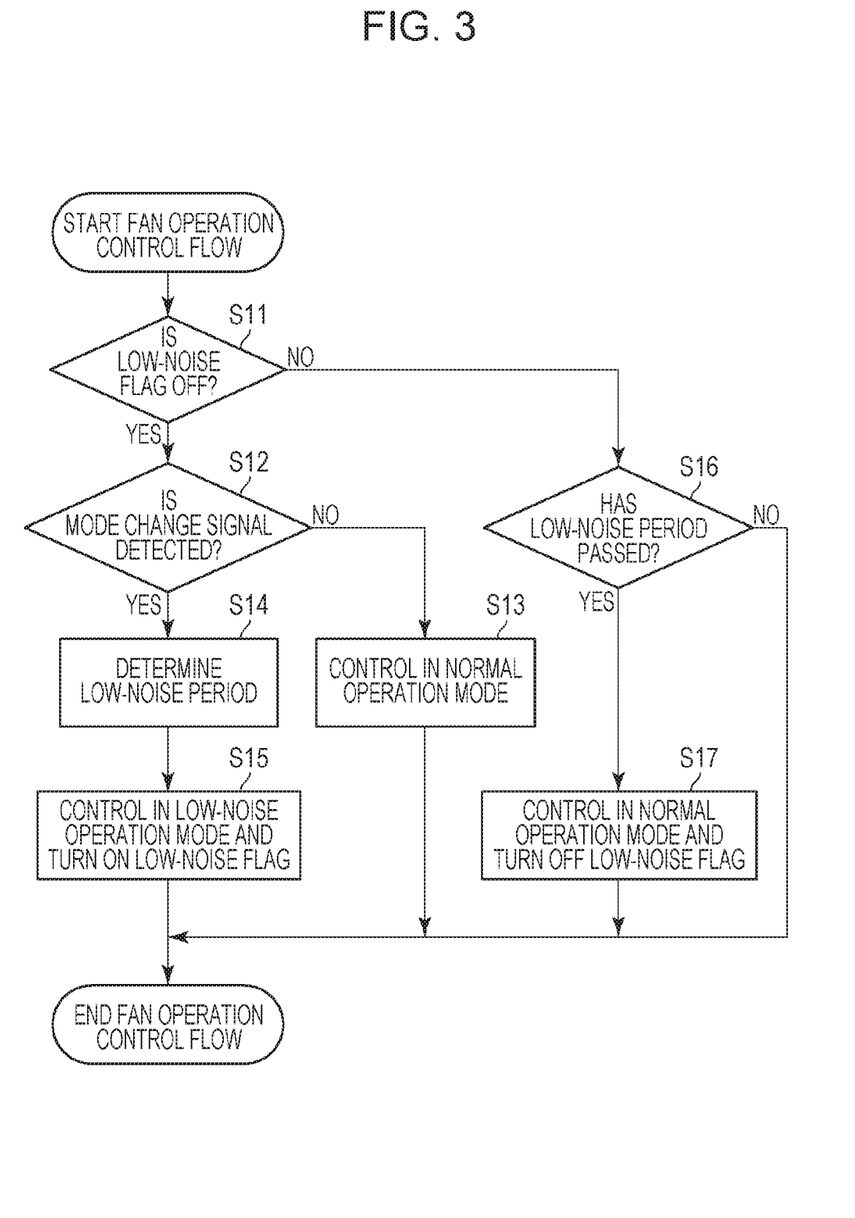
FIG. 3 is a flowchart illustrating a fan operation control flow of a fan control circuit board according to a first exemplary embodiment.

FIG. 3 is a flowchart illustrating a fan operation control flow of the fan control circuit board 3 according to the first exemplary embodiment. The fan control circuit board 3 determines whether a low-noise flag is OFF (S11). The low-noise flag is a signal indicating whether a low-noise period, which will be described below, has passed after determination whether the mode change signal is detected. When a flow starting time is within the low-noise period, an intensive cooling flag is ON.

When the low-noise flag is OFF (S11, Yes), the fan control circuit board 3 determines whether the mode change signal is detected (S12). The low-noise flag is OFF immediately after driving of the image display apparatus 100 starts.

If the mode change signal is not detected (S12, No), the fan control circuit board 3 performs control to operate the cooling fan 2 in the normal operation mode (S13). The fan control circuit board 3 determines the driving condition for the cooling fan 2 in the normal operation mode by using the ambient temperature and the power consumption.

Figure 4:
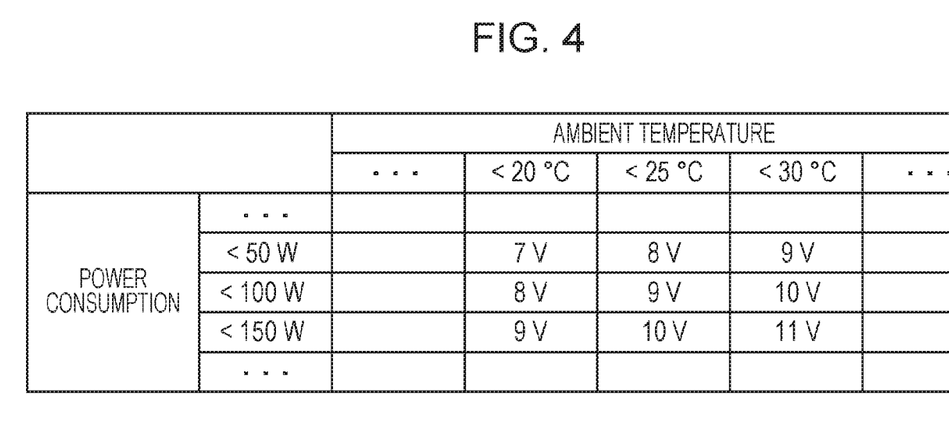
FIG. 4 illustrates normal operation information containing ambient temperature and power consumption in association with driving condition for a cooling fan in a normal operation mode.

FIG. 4 illustrates normal operation information, which is stored in the storage unit 16, containing an ambient temperature and a power consumption in association with a driving condition for the cooling fan 2 in the normal operation mode. According to the first exemplary embodiment, the driving condition is a driving voltage. In the normal operation mode, as the ambient temperature increases, the driving voltage for the cooling fan 2 increases. As the power consumption increases, the driving voltage for the cooling fan 2 increases.

The normal operation information is operation information containing a plurality of ambient temperatures and a plurality of power consumptions in association with preset driving conditions to prevent the temperature of the electronic part 14 in the display module 1 from exceeding an upper limit of the operating temperature of the electronic part 14 based on the amount of heat measured. The driving conditions stored in the operation information are not limited to the driving voltage, and can be, for example, the speed of rotation of the cooling fan 2. In S13, the fan control circuit board 3 determines a driving condition for the cooling fan 2 by using an ambient temperature, a power consumption, and normal operation information acquired from the storage unit 16 and operates the cooling fan 2 under the determined driving condition.

If the mode change signal is detected (S12, Yes), the fan control circuit board 3 controls to operate the cooling fan 2 in the low-noise operation mode. The fan control circuit board 3 acquires low-noise period information in association with an ambient temperature, a power consumption, and a low-noise period from the storage unit 16 and determines a low-noise period by using the ambient temperature and the power consumption (S14).

Figure 5:
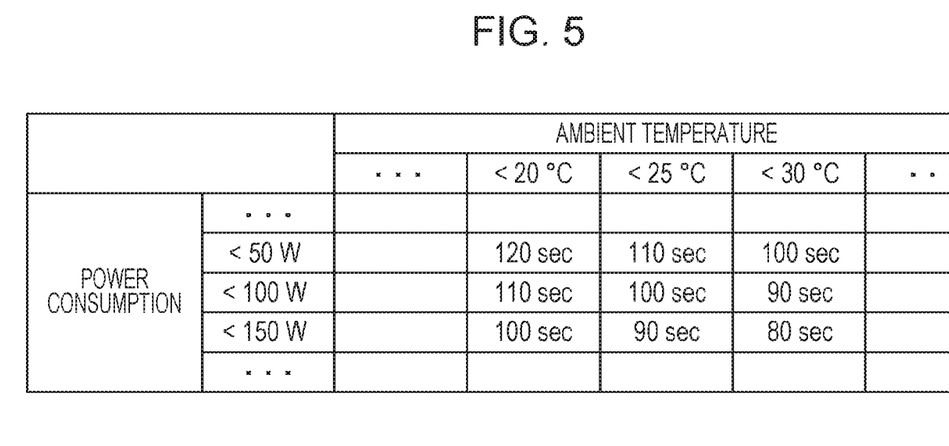
FIG. 5 illustrates low-noise period information containing ambient temperature and power consumption in association with low-noise period in a low-noise operation mode.

FIG. 5 illustrates low-noise period information containing an ambient temperature and a power consumption in association with a low-noise period in the low-noise operation mode. As the ambient temperature or the power consumption decreases, the low-noise period increases. The low-noise period is a pre-set time period to prevent the temperature of the electronic part 14 in the display module 1 from exceeding an upper limit of the operating temperature of the electronic part 14 in a case where the display module 1 is operated with a driving condition in the low-noise operation mode, which will be described below.

After the low-noise period is determined, the fan control circuit board 3 changes the operation mode of the cooling fan 2 to the low-noise operation mode and turns on the low-noise flag (S15). According to the first exemplary embodiment, the low-noise operation mode is an operation mode for stopping the cooling fan 2. The low-noise operation mode is not limited to the operation mode for stopping the cooling fan 2. The low-noise operation mode can be an operation mode for causing the speed of rotation of the cooling fan 2 to be lower than the normal operation mode such that noise generated from the cooling fan 2 operating in the normal operation mode can be lower than noise generated from the cooling fan 2 operating in the low-noise operation mode.

If it is determined in S11 that the low-noise flag is not OFF (ON) (S11, No), the fan control circuit board 3 determines whether the low-noise period has passed from the detection of the mode change signal (S16). If the low-noise period has not passed from the detection of the mode change signal (S16, No), the fan control circuit board 3 controls the cooling fan 2 in the low-noise operation mode.

If the low-noise period has passed from the detection of the mode change signal (S16, Yes), the fan control circuit board 3 changes the operation mode of the cooling fan 2 to the normal operation mode and turns off the low-noise flag (S17). Because determination of how the driving condition in the normal operation mode is the same as that in S13, repetitive description will be omitted. In other words, if the low-noise period has passed from the detection of the mode change signal, the fan control circuit board 3 can operate the cooling fan 2 in the normal operation mode in which the cooling fan 2 is operated with noise generated from the cooling fan 2 higher than noise generated in the low-noise operation mode.

The fan control circuit board 3 repeats the flow described above to enable driving of the cooling fan 2 by switching between the normal operation mode and the low-noise operation mode. While it has been described whether the flow starting time is included in the low-noise period as indicated by the ON/OFF state of the low-noise flag, it can also be determined based on information regarding the mode change signal acquisition time and the low-noise period, without using the low-noise flag.

Figure 6:
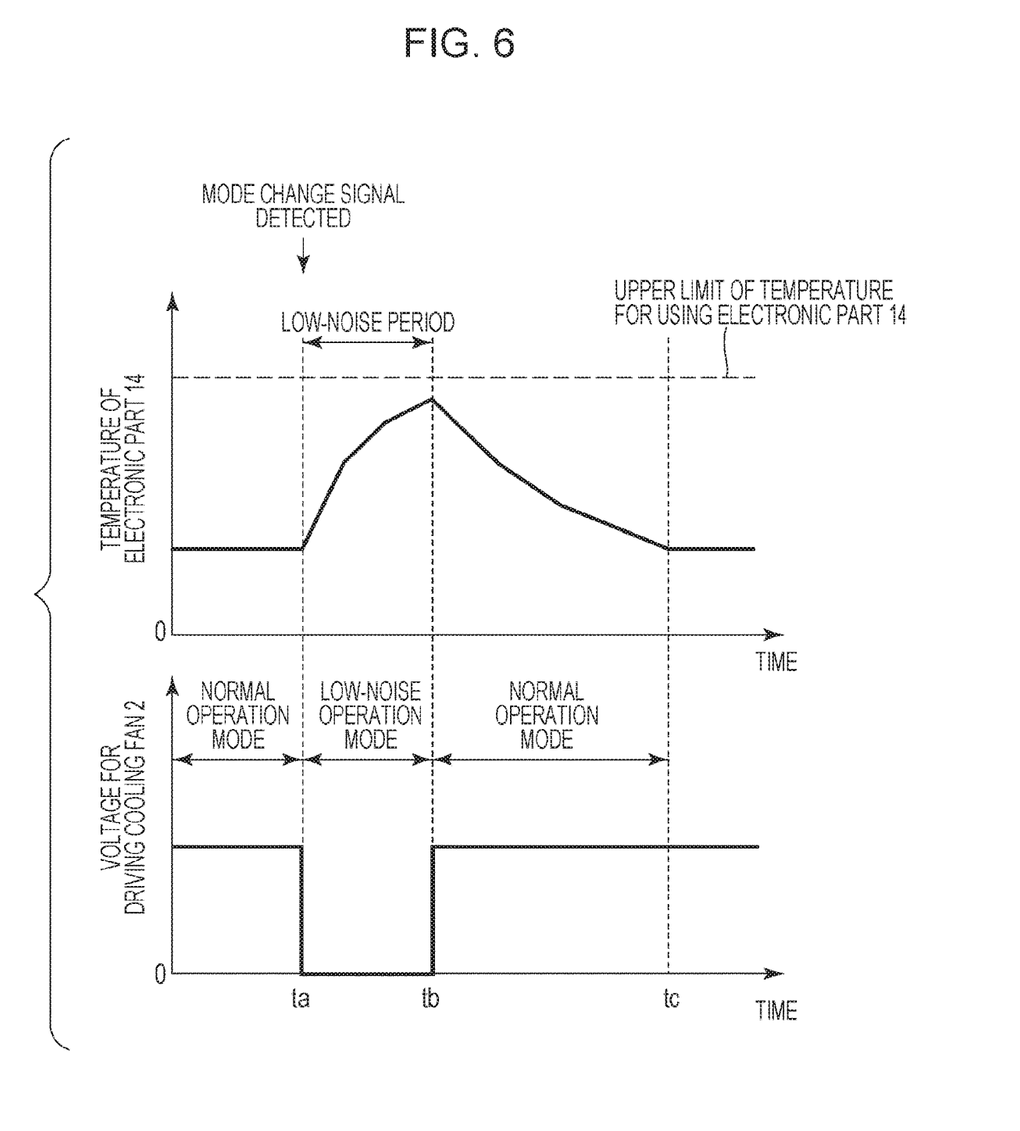
FIG. 6 schematically illustrates temperature changes of an electronic part in a case where a cooling fan is controlled based on the control flow according to the first exemplary embodiment.

FIG. 6 is a schematic diagram illustrating temperature changes of the electronic part 14 in a case where the above-described flow is applied to control the cooling fan 2. It is assumed for the present description that the ambient temperature is constant. Before "ta", the low-noise flag is OFF, and the mode change signal is not detected. Therefore, the fan control circuit board 3 controls operations of the cooling fan 2 in the normal operation mode based on the ambient temperature, power consumptions and normal operation information. In this case, the temperature of the electronic part 14 becomes steady under the upper limit of an operating temperature of the electronic part 14.

In response to detection of a mode change signal by the fan control circuit board 3 at "ta", the fan control circuit board 3 determines a low-noise period by using the power consumption and the ambient temperature and changes the operation mode of the cooling fan 2 to the low-noise operation mode. Thus, the fan control circuit board 3 stops the driving of the cooling fan 2 during a period from "ta" to "tb" after a lapse of the low-noise period.

When the cooling fan 2 stops, the outside air does not flow into the housing 5. Thus, during the period from "ta" to "tb", after a lapse of the low-noise period, the temperature of the electronic part 14 increases. However, because the low-noise period is determined such that the temperature of the electronic part 14 does not exceed the upper limit of the operating temperature of the electronic part 14 by using the ambient temperature and power consumption, the temperature of the electronic part 14 increased during the low-noise period does not exceed the upper limit of the operating temperature of the electronic part 14.

In response to a lapse of the low-noise period at "tb" from the time when the mode change signal is detected, the fan control circuit board 3 changes the operation mode of the cooling fan 2 from the low-noise operation mode to the normal operation mode. The cooling fan 2 operating in the normal operation mode can gradually reduce the temperature of the electronic part 14 increased during the low-noise period, which, then at "tc", reaches the steady temperature acquired before "ta".

In the image display apparatus according to the first exemplary embodiment, the fan control circuit board 3 determines the low-noise period in which the low-noise operation mode is enabled based on a power consumption and an ambient temperature in response to detection of the mode change signal. During the low-noise period, the fan control circuit board 3 controls the cooling fan 2 to operate in the low-noise operation mode with a lower speed of rotation than that in the normal operation mode. Therefore, also in a case where a temperature sensor is not provided in the proximity of an electronic part, noise generated from a cooling fan can be suppressed, and the temperature of the electronic part within the image display apparatus can be prevented from increasing to a high temperature.

A thermal parameter to be used for determining a driving condition and the low-noise period is not limited to the power consumption. The thermal parameter can be a parameter indicating the amount of heat that is generated from the display module 1 and which heats the electronic part 14. The inside of the image display apparatus 100 can indicate a driving voltage or a driving current for the electronic part 14. The thermal parameter can be a brightness set value for the image display apparatus 100 or a luminance value measured by the backlight brightness sensor 12.

The fan control circuit board 3 is capable of determining the driving condition based on at least an ambient temperature and controlling operations of the cooling fan 2. In this case, the operation information is associated with the ambient temperature and the driving condition.

In addition to the fan driving control, when a temperature sensor is provided within the image display apparatus, fan driving control based on a temperature detected value by the temperature sensor can be used. For example, if the temperature detected value of the backlight temperature sensor 13 exceeds a predetermined value, a control flow can be performed to change the operation mode of the cooling fan 2 to the normal operation mode before the low-noise period passes.

Second Exemplary Embodiment

Because the components, excluding the fan control circuit board 3, in the image display apparatus 100 according to a second exemplary embodiment are the same as those of the first exemplary embodiment, any repetitive description will be omitted. According to the second exemplary embodiment, the fan control circuit board 3 controls operations of the cooling fan 2 in one operation mode of the normal operation mode, the low-noise operation mode, and an intensive cooling operation mode. The fan control circuit board 3 determines a driving condition for the cooling fan 2 in an intensive cooling period and an intensive cooling operation mode by using an ambient temperature and a power consumption in response to a lapse of a low-noise period from detection of a mode change signal and controls operations of the cooling fan 2 thereunder.

Figure 7:
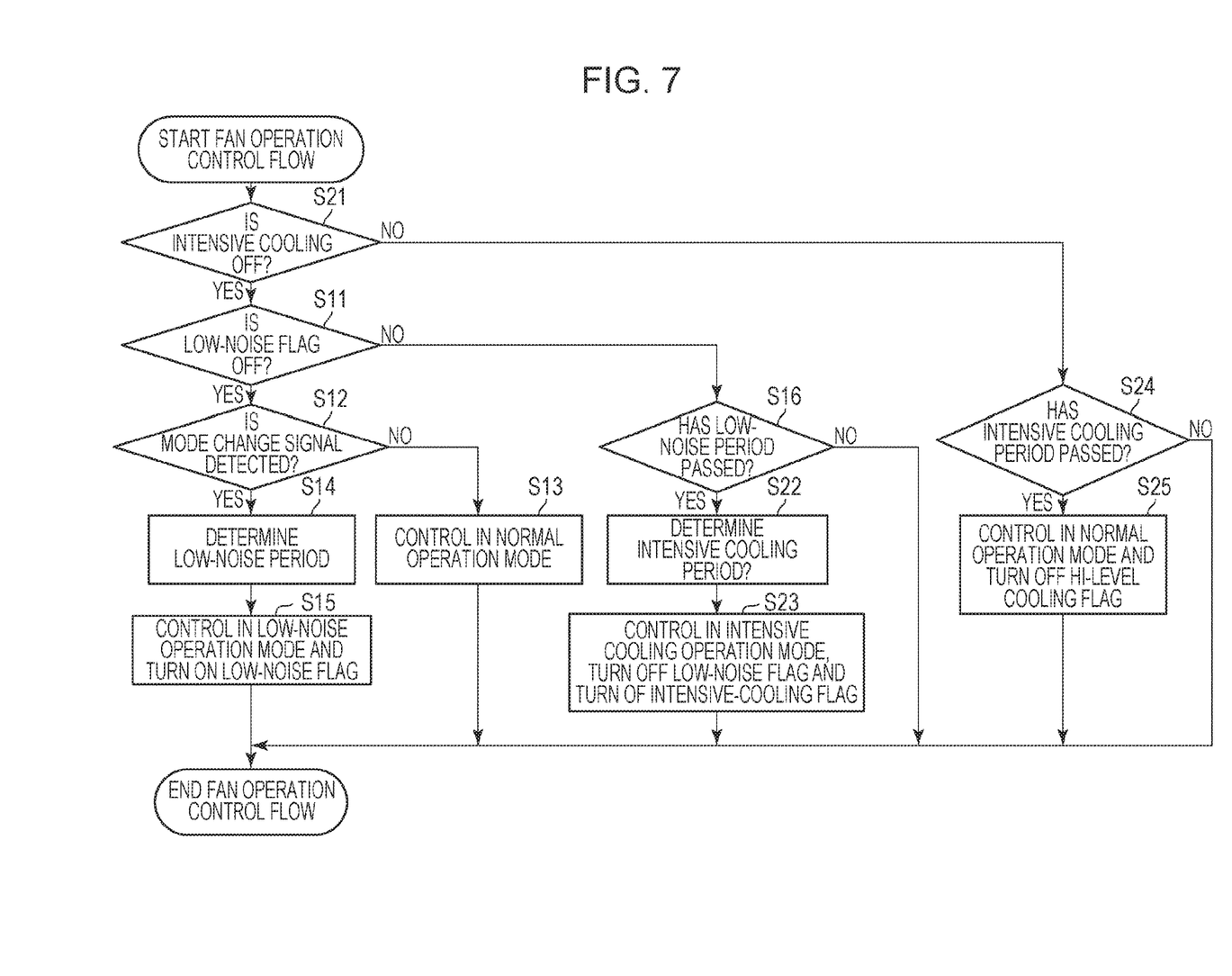
FIG. 7 schematically temperature changes of an electronic part in a case where a cooling fan is stopped.

FIG. 7 is a flowchart illustrating a fan control flow of the fan control circuit board 3 according to the second exemplary embodiment. When the fan operation control flow starts, the fan control circuit board 3 determines whether an intensive cooling flag is OFF (S21). The intensive cooling flag is a signal indicating whether an intensive cooling period, which will be described below, has passed after a lapse of a low-noise period from detection of a mode change signal. Within the intensive cooling period, the intensive cooling flag is ON.

If it is determined that the intensive cooling flag is OFF, the processing moves to S11. Because the processing from S11 to S16 is the same as that in the first exemplary embodiment, any repetitive description will be omitted. If it is determined in S16 that the low-noise period has passed (S16, Yes), the fan control circuit board 3 controls to operate the cooling fan 2 in the intensive cooling operation mode. The fan control circuit board 3 acquires intensive cooling period information containing an ambient temperature and a power consumption in association with an intensive cooling period from the storage unit 16 and determines the intensive cooling period by using the ambient temperature and the power consumption (S22).

Figure 8:
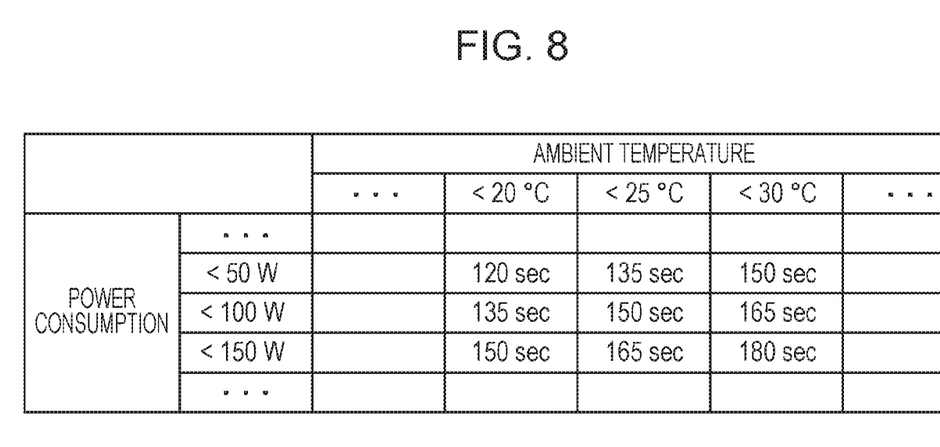
FIG. 8 illustrates intensive cooling period information containing ambient temperature and power consumption in association with intensive cooling period.

FIG. 8 illustrates the intensive cooling period information containing ambient temperatures and power consumptions in association with intensive cooling periods. As the ambient temperature or the power consumption increases, the length of the intensive cooling period increases. The intensive cooling period is a period preset based on a period necessary for the temperature of the electronic part 14 to reach a steady temperature in the normal operation mode in a case where the cooling fan 2 is operated under a driving condition in the intensive cooling operation mode, which will be described below.

After the intensive cooling period is determined, the fan control circuit board 3 changes the operation mode of the cooling fan 2 to the intensive cooling operation mode, turns on the intensive cooling flag, and turns off the low-noise flag (S23).

Figure 9:
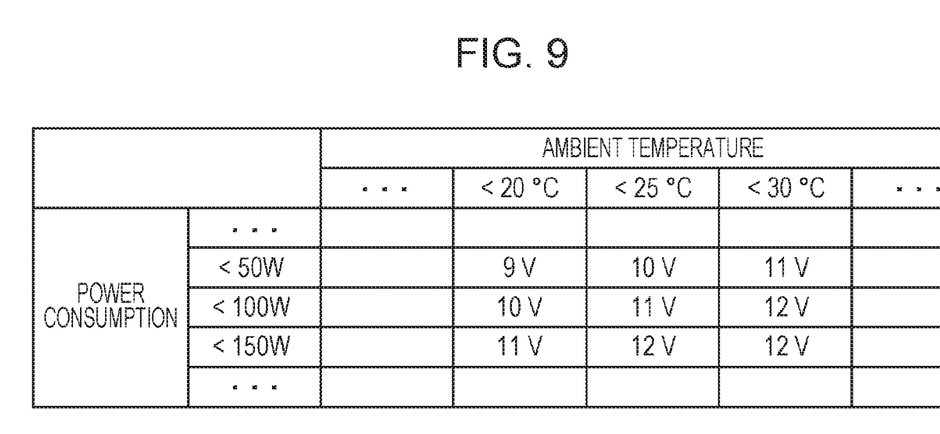
FIG. 9 illustrates cooling operation information containing ambient temperature and power consumption in association with driving condition for a cooling fan in an intensive cooling operation mode.

FIG. 9 illustrates cooling operation information containing ambient temperatures and power consumptions in association with driving conditions of the cooling fan 2 in the intensive cooling operation mode. According to the second exemplary embodiment, the driving condition is a driving voltage, and the speed of rotation increases as the driving voltage increases. In the intensive cooling operation mode, the driving voltage of the cooling fan 2 increases as the ambient temperature increases. As the power consumption increases, the driving voltage of the cooling fan 2 increases. The fan control circuit board 3 determines the driving condition of the cooling fan 2 in the intensive cooling operation mode by using the cooling operation information and the ambient temperatures and power the consumptions to control operations of the cooling fan 2.

Compared with the driving voltage in the normal operation mode illustrated in FIG. 4, the driving voltage in the intensive cooling operation mode is higher than that in the normal operation mode with an identical ambient temperature and an identical power consumption. In other words, with an identical ambient temperature and an identical power consumption, the speed of rotation of the cooling fan 2 in the intensive cooling operation mode is higher than that in the normal operation mode. Thus, the cooling fan 2 operating in the intensive cooling operation mode compared with the cooling fan 2 operated in the normal operation mode can achieve a higher cooling efficiency and generate larger noise.

If it is determined in S21 that the intensive cooling flag is not OFF, the fan control circuit board 3 determines whether the intensive cooling period has passed after a lapse of the low-noise period from detection of the mode change signal (S24).

If it is determined that the intensive cooling period has passed (S24, Yes), the fan control circuit board 3 changes the operation mode of the cooling fan 2 to the normal operation mode and turns on the intensive cooling flag (S25). Because how the driving condition in the normal operation mode for the cooling fan 2 is determined is the same as that in S13 according to the first exemplary embodiment, repetitive description will be omitted. If it is determined in S24 that the intensive cooling period has not passed (S24, No), the fan control circuit board 3 controls operations of the cooling fan 2 continuously in the intensive cooling operation mode.

Figure 10:
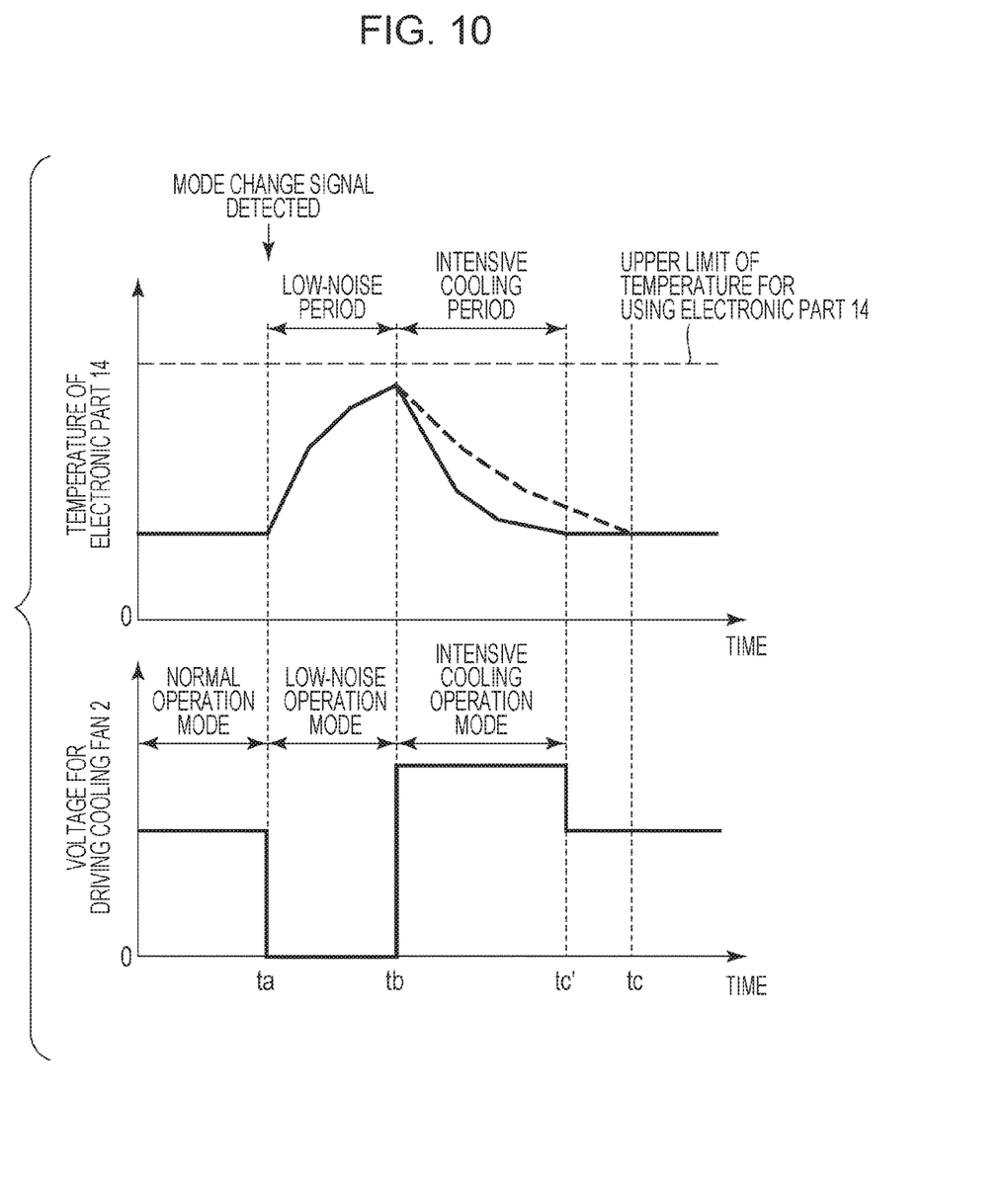
FIG. 10 schematically illustrates temperature changes of an electronic part in a case where a cooling fan is controlled based on a control flow according to a second exemplary embodiment.

FIG. 10 schematically illustrates temperature changes of the electronic part 14 in a case where the above-described flow is applied to control the cooling fan 2. It is assumed that the ambient temperature and the power consumption are constant at a similar temperature to the temperature according to the first exemplary embodiment. The solid lines in FIG. 10 represent temperature changes of the electronic part 14 according to the second exemplary embodiment. The broken lines in FIG. 10 represent temperature changes of the electronic part 14 according to the first exemplary embodiment for comparison. Before "ta", both the low-noise flag and the intensive cooling flag are OFF, and no mode change signal is detected. Because the same control and temperature changes as those of the first exemplary embodiment occur until "tb", any repetitive description will be omitted.

In response to a lapse of the low-noise period from detection of the mode change signal at "tb", the fan control circuit board 3 changes the operation mode of the cooling fan 2 from the low-noise operation mode to the intensive cooling operation mode. The cooling fan 2 operating in the intensive cooling operation mode having a higher cooling efficiency than that of the normal operation mode can more quickly reduce the temperature of the electronic part 14 increased during the low-noise period compared with the first exemplary embodiment, and, at "tc'", the temperature reaches the steady temperature acquired at ta. The time period from "tb" to "tc'" is shorter than the time period from "tb" to "tc", and cooling completes in a shorter period of time than the normal operation mode.

The noise generated from the cooling fan 2 operating in the intensive cooling operation mode is higher than the noise generated from the cooling fan 2 operating in the normal operation mode. However, the fan control circuit board 3 sets an intensive cooling period in accordance with the ambient temperature and power consumption so that the time period for increasing the noise generated from the cooling fan 2 can be suppressed.

In the image display apparatus according to the second exemplary embodiment, the fan control circuit board 3 determines a low-noise period in which the cooling fan 2 can operate in the low-noise operation mode by using the power consumption and the ambient temperature in response to detection of a mode change signal. The fan control circuit board 3 then controls to operate the cooling fan 2 in the low-noise operation mode with a lower speed of rotation than the normal operation mode during the low-noise period. The intensive cooling period in which the cooling fan 2 operates in the intensive cooling operation mode after the low-noise period is determined in accordance with the power consumption and the ambient temperature.

In the image display apparatus according to the second exemplary embodiment, when a temperature sensor is not provided in proximity to an electronic part, noise generated from a cooling fan can be suppressed, and the temperature of the electronic part within the image display apparatus can be prevented from increasing to a high temperature. In the image display apparatus according to the second exemplary embodiment, the temperature inside the image display apparatus can be cooled quickly, and the influence of increased noise generated from the cooling fan 2 can be suppressed.

Third Exemplary Embodiment

Because the components, excluding the fan control circuit board 3, in the image display apparatus 100 according to a third exemplary embodiment are the same as those of the second exemplary embodiment, any repetitive description will be omitted. According to the third exemplary embodiment, the fan control circuit board 3 controls operations of the cooling fan 2 in one operation mode of the normal operation mode, the low-noise operation mode and the intensive cooling operation mode, like the second exemplary embodiment. The third exemplary embodiment is different from the second exemplary embodiment in that the fan control circuit board 3 updates a driving condition in the intensive cooling period and the intensive cooling operation mode by using an ambient temperature and a power consumption within the intensive cooling period in which the cooling fan 2 is operated in the intensive cooling operation mode.

Figure 11:
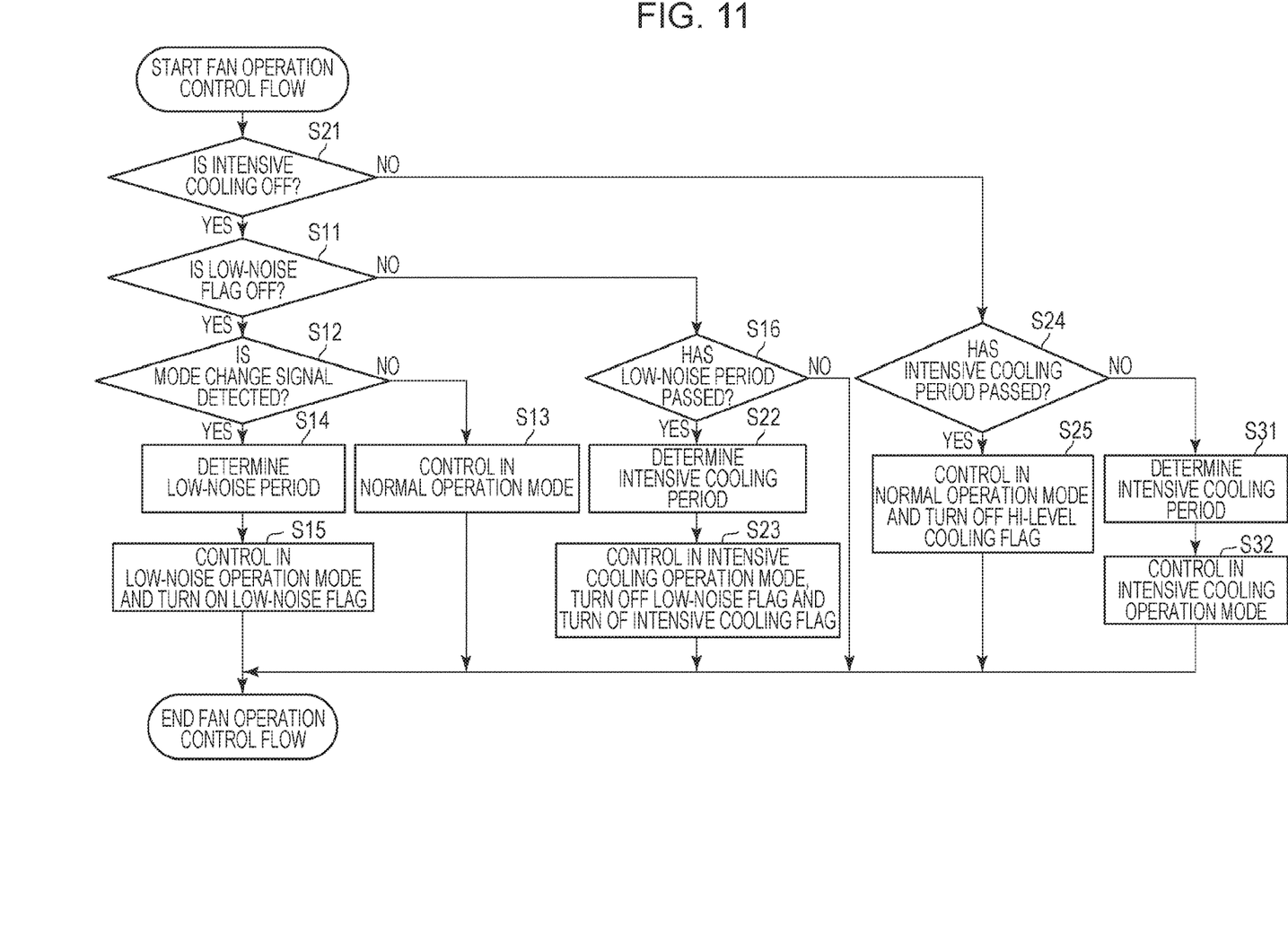
FIG. 11 is a flowchart illustrating a fan control flow for a fan control circuit board according to a third exemplary embodiment.

FIG. 11 is a flowchart illustrating a fan control flow of the fan control circuit board 3 according to the third exemplary embodiment. Because the processing in S11 to S17 and S21 to S24 is the same as that in the first exemplary embodiment and the second exemplary embodiment, any repetitive description will be omitted. In S24, if it is determined that the intensive cooling period has not passed (S24, No), the fan control circuit board 3 acquires the ambient temperature and the power consumption and determines an intensive cooling period by using the intensive cooling period information acquired from the storage unit 16 (S31).

The fan control circuit board 3 determines a driving condition for the cooling fan 2 in the intensive cooling operation mode by using the ambient temperature and the power consumption (S32). Because how the driving condition in the intensive cooling operation mode is determined is the same as that in S23, any repetitive description will be omitted.

Figure 12:
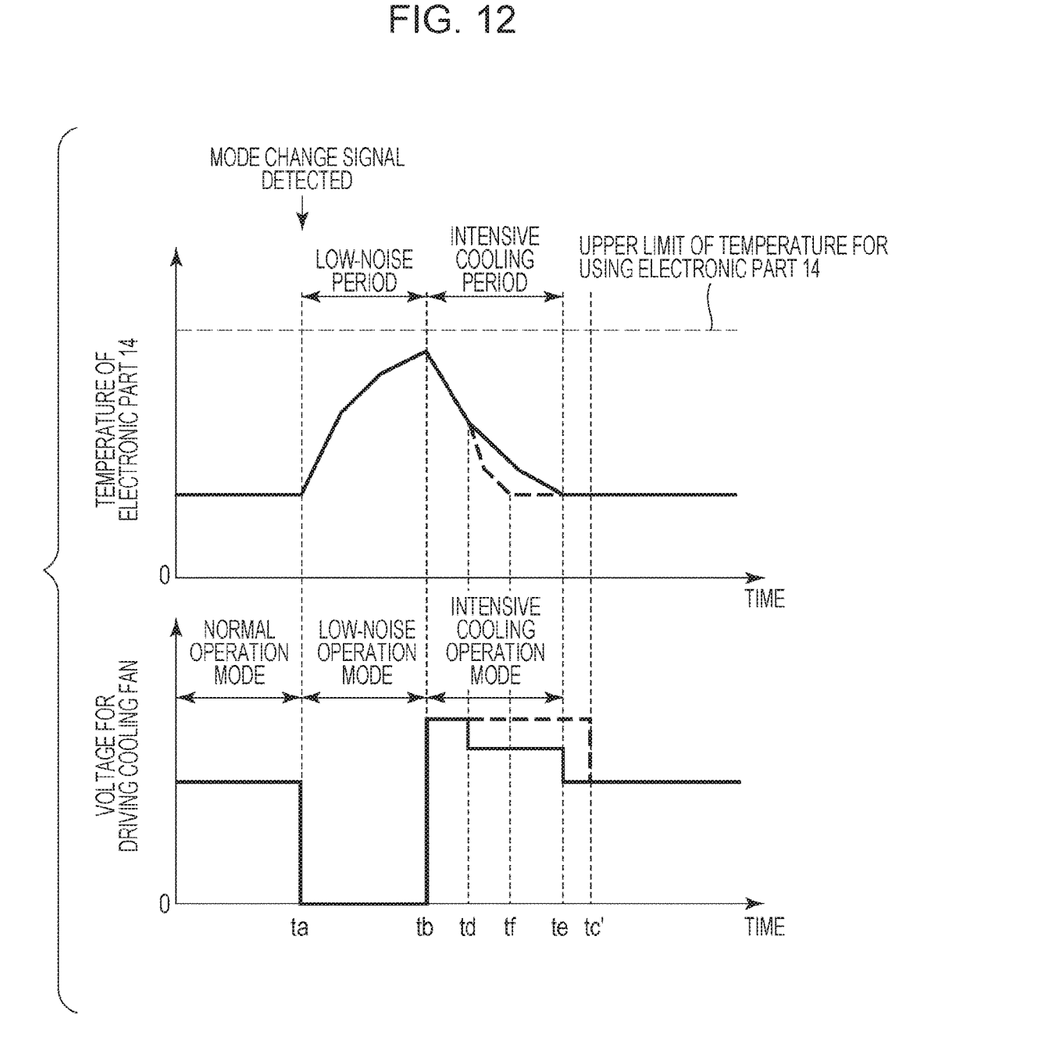
FIG. 12 schematically illustrates temperature changes of an electronic part in a case where a cooling fan is controlled based on a control flow according to the third exemplary embodiment.

FIG. 12 schematically illustrates temperature changes of the electronic part 14 in a case where the above-described flow is applied to control the cooling fan 2. Referring to FIG. 12, the ambient temperature decreases before and after "td". The solid lines in FIG. 12 represent temperatures of the electronic part 14 and driving voltage for the cooling fan 2 in a case where the cooling fan 2 is controlled by applying the flow according to the third exemplary embodiment. The broken lines in FIG. 12 represent comparison examples of the temperatures of the electronic part 14 and driving voltage for the cooling fan 2 in a case where the cooling fan 2 is controlled by applying the flow according to the second exemplary embodiment. Because the same control and temperature changes occur as those in the first exemplary embodiment and second exemplary embodiment up to "tb", any repetitive description will be omitted.

In response to a lapse of the low-noise period from detection of the mode change signal at "tb", the fan control circuit board 3 changes the operation mode of the cooling fan 2 from the low-noise operation mode to the intensive cooling operation mode. At "td", because the ambient temperature decreases, the fan control circuit board 3 updates the driving condition for the cooling fan 2 and the intensive cooling period based on cooling operation information. More specifically, the fan control circuit board 3 reduces the driving voltage for the cooling fan 2 and the intensive cooling period.

The reduction of the driving voltage for the cooling fan 2 can reduce the speed of rotation of the cooling fan 2, which then lowers the noise generated from the cooling fan 2. The reduced ambient temperature can prevent decreases of the cooling efficiency of the electronic part 14 while the amount of air to be sent from the cooling fan 2 to the housing 5 decreases. At "te", the temperature of the electronic part 14 reaches the steady temperature acquired before "ta".

In a case where the cooling fan 2 is controlled by applying the flow according to the second exemplary embodiment, the intensive cooling period and the driving condition in the intensive cooling operation mode can be the same as those determined at "tb" while the ambient temperature decreases within the intensive cooling period. Thus, at and after "td", the decreasing ambient temperature increases the cooling efficiency of the electronic part 14, and, at "tf", the temperature of the electronic part 14 reaches the steady temperature acquired before "ta". However, because the intensive cooling period is from "tb" to "tc'", the cooling fan 2 is kept to be driven with a high speed of rotation from "tf" to "tc'".

In the image display apparatus according to the third exemplary embodiment, the fan control circuit board 3 determines a low-noise period in which the cooling fan 2 can operate in the low-noise operation mode by using the power consumption and the ambient temperature in response to detection of a mode change signal. Then, in the image display apparatus according to the third exemplary embodiment, the fan control circuit board 3 during the low-noise period controls the cooling fan 2 to operate in the low-noise operation mode having a lower speed of rotation than that in the normal operation mode. The intensive cooling period in which the cooling fan 2 operates in the intensive cooling operation mode after the low-noise period is determined in accordance with the power consumption and the ambient temperature.

In the image display apparatus according to the third exemplary embodiment, even when a temperature sensor is not provided in proximity to an electronic part, the noise generated from the cooling fan can be suppressed, and increases of the temperature of the electronic part within the image display apparatus can be prevented. In the image display apparatus according to the third exemplary embodiment, the driving conditions in the intensive cooling period and the intensive cooling operation mode are updated in accordance with the ambient temperature and the power consumption so that cooling with reduced noise generated from the cooling fan 2 can be realized.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-170596, filed Aug. 31, 2015, which is hereby incorporated by reference herein in its entirety.

What is claimed is:

1. An image display apparatus connected to an imaging apparatus comprising:
a display module configured to display an image;
a fan configured to rotate to cool the display module;
a first detecting unit configured to acquire an ambient temperature of the display module; and
a control unit configured to control a speed of rotation of the fan,
wherein, in response to acquisition, by the control unit, of a signal corresponding to a recording instruction given by the imaging apparatus, the control unit controls the speed of rotation the fan from a first speed of rotation to a second speed of rotation lower than the first speed of rotation, and
wherein, in response to a lapse of a first period determined based on the ambient temperature, the control unit controls the speed of rotation of the fan from the second speed of rotation to a third speed of rotation higher than the second speed of rotation.

2. The image display apparatus according to claim 1, further comprising a determining unit configured to determine the first period in response to acquisition of the signal.

3. The image display apparatus according to claim 1, wherein the first period determined in a case where the ambient temperature exhibits a first temperature is shorter than the first period determined in a case where the ambient temperature exhibits a second temperature higher than the first temperature.

4. The image display apparatus according to claim 1, wherein the second speed of rotation is equal to 0.

5. The image display apparatus according to claim 1, further comprising an acquiring unit configured to acquire a thermal parameter indicating an amount of heat generated from the display module, wherein the control unit controls the speed of rotation of the fan to the second speed of rotation and the speed of rotation of the fan to the third speed of rotation in response to a lapse of the first period determined based on the ambient temperature and the thermal parameter.

6. The image display apparatus according to claim 5, wherein the first period determined in a case where the thermal parameter is a first value is longer than the first period determined in a case where the thermal parameter is a second value greater than the first value.

7. The image display apparatus according to claim 5, wherein the thermal parameter is at least one of a driving voltage, a driving current, a power consumption, or a brightness set value of the display module.

8. The image display apparatus according to claim 1, wherein the third speed of rotation is equal to the first speed of rotation.

9. The image display apparatus according to claim 1, wherein the third speed of rotation is greater than the first speed of rotation.

10. The image display apparatus according to claim 1, wherein the control unit controls the fan to the first speed of rotation in response to an elapse of a second time period from a time when the control unit controls the speed of rotation of the fan to the third speed of rotation, the second time period determined based on the ambient temperature.

11. The image display apparatus according to claim 10, further comprising a determining unit configured to determine the second time period based on the ambient temperature in response to the control unit controlling speed of the rotation of the fan to the third speed.

12. The image display apparatus according to claim 1, wherein the display module comprises:
a backlight configured to emit light;
a liquid crystal panel configured to enable light irradiated from the backlight to pass through and display an image;
a control circuit board configured to control the backlight and the liquid crystal panel; and
a housing configured to cover at least a back surface of the backlight and the control circuit board,
wherein the fan exchanges air inside the housing and air outside the housing to cool the display module.

13. The image display apparatus according to claim 12, wherein the first detecting unit is provided within the housing.

14. The image display apparatus according to claim 1, further comprising a second detecting unit configured to acquire information describing a temperature inside the display module,
wherein the control unit controls the speed of rotation of the fan to the second speed of rotation, and wherein, in a case where a temperature detected by the second detecting unit exceeds a predetermined temperature, the control unit controls the speed of rotation of the fan to the third speed of rotation.

15. A control method for an image display apparatus connected to an imaging apparatus, the image display apparatus including a display module configured to display an image and a fan configured to rotate to cool the display module, the method comprising the steps of:
an acquiring step of acquiring an ambient temperature of the display module; and
a controlling step of controlling a speed of rotation of the fan,
wherein, in response to acquisition, by the controlling step, of a signal corresponding to a recording instruction given by the imaging apparatus, the controlling step controls the speed of rotation the fan from a first speed of rotation to a second speed of rotation lower than the first speed of rotation, and
wherein, in response to a lapse of a first period determined based on the ambient temperature, the controlling step controls the speed of rotation of the fan from the second speed of rotation to a third speed of rotation higher than the second speed of rotation.

16. An image display apparatus comprising:
a display module configured to display an image;
a fan configured to rotate to cool the display module;
a sensor configured to detect a value corresponding to a temperature of the display module; and
a control unit configured to control a speed of rotation of the fan, wherein,
in response to an input of a predetermined instruction to the control unit, the control unit determines a first period based on the detected value and decreases the speed of rotation of the fan from a first speed of rotation to a second speed of rotation, wherein
in response to a lapse of the first period after decreasing the speed of rotation of the fan, the control unit increases the speed of rotation of the fan from the second speed of rotation to a third speed of rotation.

17. The image display apparatus according to claim 16, wherein
the control unit controls the fan to stop during the first period.

18. The image display apparatus according to claim 16, wherein
the third speed of rotation is higher than the first speed of rotation.

19. The image display apparatus according to claim 16, wherein
the image display apparatus is connected to an imaging apparatus, and
the predetermined instruction is a signal outputted by the imaging apparatus in response to beginning a recording operation.

20. The image display apparatus according to claim 16, wherein
the predetermined instruction is an instruction to change an operation mode of the fan, the instruction inputted by a user.

21. The image display apparatus according to claim 16, further comprising
an acquiring unit configured to acquire a thermal parameter corresponding to an amount of heat generated from the display module,
wherein the control unit determines the first period based on the detected value and the thermal parameter.

22. The image display apparatus according to claim 21, wherein the thermal parameter is at least one of a driving voltage, a driving current, a power consumption, or a brightness set value of the display module.

23. The image display apparatus according to claim 16, wherein
the third speed of rotation is equal to the first speed of rotation.

24. The image display apparatus according to claim 16, wherein
the display module comprises:
a backlight configured to emit light;
a liquid crystal panel configured to enable light irradiated from the backlight to pass through and display an image;

a control circuit board configured to control the backlight and the liquid crystal panel; and a housing configured to cover at least a back surface of the backlight and the control circuit board, wherein the fan exchanges air inside the housing and air outside the housing to cool the display module.

25. A control method for an image display apparatus including a display module configured to display an image, a fan configured to rotate to cool the display module, and a sensor configured to detect a value corresponding to a temperature of the display module, the method comprising the steps of:

acquiring the value from the sensor, and controlling the speed of rotation the fan based on the value acquired, wherein in response to an input of a predetermined instruction to the image display apparatus, determining a first period determined based on the detected value and decreasing the speed of rotation the fan from a first speed of rotation to a second speed of rotation, and in response to a lapse of the first period after the decreasing the speed of rotation of the fan, increasing the speed of rotation of the fan from the second speed of rotation to a third speed of rotation.

* * * * *